(12) United States Patent
Han

(10) Patent No.: US 9,017,883 B2
(45) Date of Patent: Apr. 28, 2015

(54) RECHARGEABLE LITHIUM BATTERY

(75) Inventor: Su-Hee Han, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 707 days.

(21) Appl. No.: 13/243,670

(22) Filed: Sep. 23, 2011

(65) Prior Publication Data

US 2012/0202125 A1 Aug. 9, 2012

(30) Foreign Application Priority Data

Feb. 9, 2011 (KR) ........................ 10-2011-0011509

(51) Int. Cl.
*H01M 6/16* (2006.01)
*H01M 4/13* (2010.01)
*H01M 4/58* (2010.01)
*H01M 4/485* (2010.01)
*H01M 10/0568* (2010.01)
*H01M 10/0569* (2010.01)

(52) U.S. Cl.
CPC .......... *H01M 4/485* (2013.01); *H01M 10/0568* (2013.01); *H01M 10/0569* (2013.01); *Y02E 60/122* (2013.01)

(58) Field of Classification Search
USPC ......... 429/231.5, 231.95, 327, 329, 336, 340, 429/341
See application file for complete search history.

(56) References Cited

U.S. PATENT DOCUMENTS

| | | | |
|---|---|---|---|
| 7,282,304 B2 | 10/2007 | Kawai et al. | |
| 8,197,969 B2 * | 6/2012 | Hirose et al. ............ | 429/231.95 |
| 2008/0166637 A1 * | 7/2008 | Inagaki et al. ............... | 429/329 |
| 2009/0142663 A1 | 6/2009 | Takeuchi et al. | |
| 2010/0196764 A1 | 8/2010 | Ihara et al. | |
| 2011/0014504 A1 | 1/2011 | Onuki et al. | |

FOREIGN PATENT DOCUMENTS

| | | |
|---|---|---|
| JP | 200624575 | 1/2006 |
| JP | 2007-323958 A | 12/2007 |
| KR | 20010095511 | 11/2001 |
| KR | 20060063035 | 6/2006 |
| KR | 10-2008-0031151 A | 4/2008 |
| KR | 20090053467 | 5/2009 |
| KR | 10-2011-0027627 A | 3/2011 |

OTHER PUBLICATIONS

Korean Office Action dated Jan. 22, 2013 in connection with Korean Patent Application No. 10-2011-0011509 and Request for Entry of the Accompanying Office Action attached herewith.

\* cited by examiner

*Primary Examiner* — Patrick Ryan
*Assistant Examiner* — Julian Anthony
(74) *Attorney, Agent, or Firm* — Robert E. Bushnell, Esq.

(57) ABSTRACT

The present invention discloses a rechargeable lithium battery including a positive electrode, a negative electrode including lithium titanate represented by Chemical Formula 1, and an electrolyte impregnating the positive and negative electrodes and including a sultone-based compound and maleic anhydride, wherein the sultone-based compound and the maleic anhydride are respectively included in an amount of about 0.5 wt % to about 5 wt % based on the total weight of the electrolyte. Chemical Formula 1: $Li_{4-x}Ti_{5+x-y}M_yO_{12}$. In Chemical Formula 1, M is an element selected from Mg, V, Cr, Nb, Fe, Ni, Co, Mn, W, Al, Ga, Cu, Mo, P, or a combination thereof, $0 \leq x \leq 1$, $0 \leq y \leq 1$.

6 Claims, 1 Drawing Sheet

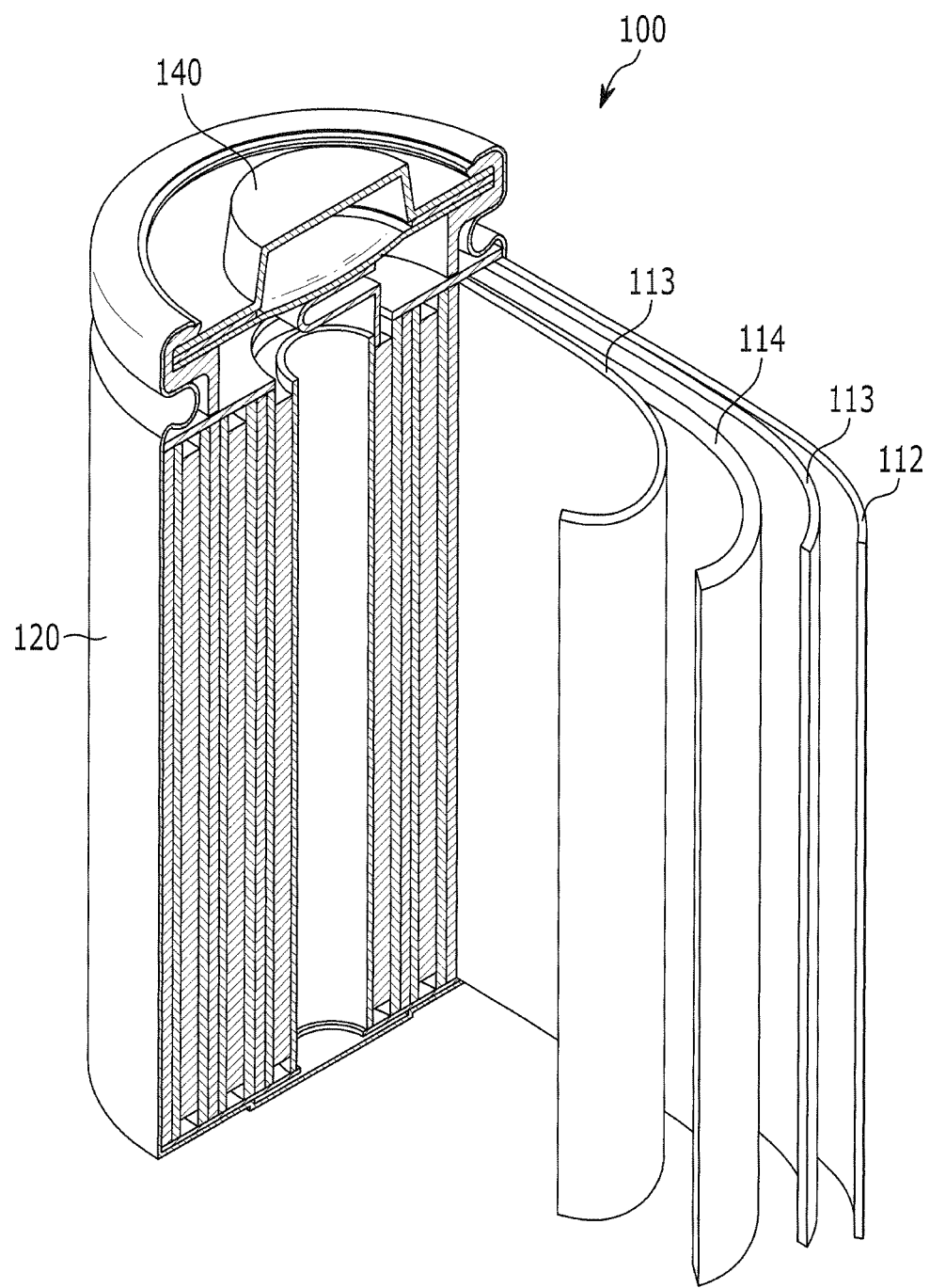

RECHARGEABLE LITHIUM BATTERY

CLAIM OF PRIORITY

This application makes reference to, incorporates the same herein, and claims all benefits accruing under 35 U.S.C. §119 from an application for RECHARGEABLE LITHIUM BATTERY earlier filed in the Korean Intellectual Property Office on 9 Feb. 2011 and there duly assigned Serial No. 10-2011-0011509.

BACKGROUND OF THE INVENTION

1. Field of the Invention

This disclosure relates to a rechargeable lithium battery.

2. Description of the Related Art

Batteries transform chemical energy generated from an electrochemical redox reaction in the battery into electrical energy. Such batteries are divided into a primary battery, which should be disposed after the energy inside the battery is consumed, and a rechargeable battery, which can be recharged.

The rechargeable battery can be charged/discharged several times based on the reversible transformation between chemical energy and electrical energy.

Recent developments in the high-tech electronics industry allows electronic devices to become small and light in weight, which leads to an increase in portable electronic devices. As a power source for such portable electronic devices, the demands for batteries with high energy density are increasing and research on lithium rechargeable batteries is under progress.

The rechargeable lithium battery is fabricated by injecting electrolyte into a battery cell, which includes a positive electrode including a positive active material capable of intercalating/deintercalating lithium ions and a negative electrode including a negative active material capable of intercalating/deintercalating lithium ions. The negative active material includes compounds alloying with lithium and oxides thereof.

The compound alloying with lithium may include lithium titanate (LTO). The lithium titanate has relatively high oxidation reduction potential and thus, may not only have almost no electrolyte decomposition but also stable crystal structure, resulting in excellent cycle characteristic.

However, when the lithium titanate is used as a negative active material, it may suffer volume-expansion at a high temperature and thus, increase the thickness. This thickness increase may deteriorate output and capacity as well as bring about external transformation of the battery.

SUMMARY OF THE INVENTION

One aspect of the present invention provides a rechargeable lithium battery including lithium titanate oxide as a negative active material having no influence on battery characteristics and reducing an increase of the thickness of the rechargeable lithium battery at a high temperature.

According to one aspect of the present invention, a rechargeable lithium battery is provided that includes a positive electrode, a negative electrode including lithium titanate oxide represented by the following Chemical Formula 1, and an electrolyte impregnated in the positive and the negative electrodes and including a sultone-based compound and maleic anhydride. The sultone-based compound and the maleic anhydride are respectively included in amount of 0.5 wt % to 5 wt % based on the total weight of the electrolyte.

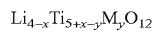

Chemical Formula 1

In Chemical Formula 1, M is an element selected from Mg, V, Cr, Nb, Fe, Ni, Co, Mn, W, Al, Ga, Cu, Mo, P, or a combination thereof, and $0 \le x \le 1$, and $0 \le y \le 1$.

The sultone-based compound may include a compound represented by the following Chemical Formula 2.

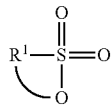

[Chemical Formula 2]

In Chemical Formula 2, $R^1$ is a substituted or unsubstituted C1 to C6 alkyl group, a substituted or unsubstituted C2 to C6 alkenyl group, or a combination thereof.

The sultone-based compound may include propanesultone, propenesultone, or a combination thereof.

The sultone-based compound and the maleic anhydride may be included in a weight ratio ranging from about 1:50 to about 50:1.

When the rechargeable lithium battery is stored at 60° C. for 30 days, it may have a thickness increase rate of about less than 10% and an open circuit voltage (OCV) maintenance ratio of about 90% or more.

The electrolyte may further include a non-aqueous organic solvent and a lithium salt.

The non-aqueous organic solvent may include a carbonate-based, ester-based, ether-based, ketone-based, alcohol-based, or aprotic solvent, or a combination thereof.

Accordingly, the electrolyte may suppress volume expansion of a lithium rechargeable battery at a high temperature and thus, decrease external transformation of the lithium rechargeable battery and maintain output and battery capacity and simultaneously, prevent deterioration of open circuit voltage (OCV) of the lithium rechargeable battery, securing excellent battery characteristics.

BRIEF DESCRIPTION OF THE DRAWINGS

FIG. 1 is a schematic view showing a rechargeable lithium battery according to one embodiment of the present invention.

DETAILED DESCRIPTION OF THE INVENTION

A more complete appreciation of the invention, and many of the attendant advantages thereof, will be readily apparent as the same becomes better understood by the reference to the following detailed description when considered in conjunction with the accompanying drawings in which like reference symbols indicate the same or similar components, wherein:

This disclosure will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Referring to FIG. 1, a rechargeable lithium battery according to one embodiment will be described.

FIG. 1 is a schematic view showing a rechargeable lithium battery according to one embodiment of the present invention.

Referring to FIG. 1, the rechargeable lithium battery 100 includes a battery cell including a positive electrode 114, a negative electrode 112 facing the positive electrode 114, a separator 113 interposed between the positive electrode 114 and the negative electrode 112, an electrolyte (not shown) impregnating the positive electrode 114, negative electrode 112, and separator 113, a battery case 120, and a sealing member 140 sealing the battery case 120.

The positive electrode 114 includes a current collector and a positive active material layer formed on the current collector.

The current collector may include aluminum foil, but it is not limited thereto.

The positive active material layer includes a positive active material, a binder, and a conductive material.

For the positive active material, compounds being capable of reversibly intercalating and deintercalating lithium ions may be used without limitation. Examples of the positive active material include composite oxides including lithium (Li) and a metal selected from the group consisting of cobalt (Co), manganese (Mn), nickel (Ni), and combinations thereof.

The positive active material may include, for example $Li_aA_{1-b}D_bE_2$ (0.90≤a≤1.8, 0≤b≤0.5.); $Li_aG_{1-b}D_bO_{2-c}J_c$ (0.90≤a≤1.8, 0≤b≤0.5, 0≤c≤0.05.); $LiG_{2-b}D_bO_{4-c}J_c$ (0≤b≤0.5, 0≤c≤0.05.); $Li_aNi_{1-b-c}Co_bD_cE_\alpha$ (0.90≤a≤1.8, 0≤b≤0.5, 0≤c≤0.05, 0<α≤2.); $Li_aNi_{1-b-c}Co_bD_cO_{2-\alpha}J_\alpha$ (0.90≤a≤1.8, 0≤b≤0.5, 0≤c≤0.05, 0<α<2.); $Li_aNi_{1-b-c}Co_{b-}D_cO_{2-\alpha}J_2$ (0.90≤a≤1.8, 0≤b≤0.5, 0≤c≤0.05, 0<α<2.); $Li_aNi_{1-b-c}Mn_bD_cE_\alpha$(0.90≤a≤1.8, 0≤b≤0.5, 0≤c≤0.05, 0<α<2.); $Li_aNi_{1-b-c}Mn_bD_cO_{2-\alpha}J_\alpha$ (0.90≤a≤1.8, 0≤b≤0.5, 0≤c≤0.05, 0<α<2.); $Li_aNi_{1-b-c}Mn_bD_cO_{2-\alpha}J_2$ (0.90≤a≤1.8, 0≤b≤0.5, 0≤c≤0.05, 0<α<2.); $Li_aNi_bG_cL_dO_2$ (0.90≤a≤1.8, 0≤b≤0.9, 0≤c≤0.5, 0.001≤d≤0.1.); $Li_aNi_bCo_cMn_dL_eO_2$ (0.90≤a≤1.8, 0≤b≤0.9, 0≤c≤0.5, 0≤d≤0.5, 0.001≤e≤0.1.); $Li_aNiL_bO_2$ (0.90≤a≤1.8, 0.001≤b≤0.1.); $Li_aCoL_bO_2$ (0.90≤a≤1.8, 0.001≤b≤0.1.); $Li_aMnL_bO_2$ (0.90≤a≤1.8, 0.001≤b≤0.1.); $Li_aMn_2L_bO_4$ (0.90≤a≤1.8, 0.001≤b≤0.1.); $QO_2$; $QS_2$; $LiQS_2$; $V_2O_5$; $LiV_2O_5$; $LiRO_2$; $LiNiVO_4$; $Li_{(3-f)}Z_2(PO_4)_3$ (0≤f≤2); $Li_{(3-f)}Fe_2(PO_4)_3$ (0≤f≤2); and $LiFePO_4$.

Herein, A is selected from the group consisting of Ni, Co, Mn, and a combination thereof; D is selected from the group consisting of Al, Ni, Co, Mn, Cr, Fe, Mg, Sr, V, a rare earth element, and a combination thereof; E is selected from the group consisting of O, F, S, P, and a combination thereof; G is selected from the group consisting of Co, Mn, and a combination thereof; J is selected from the group consisting of F, S, P, and a combination thereof; L is selected from the group consisting of Al, Cr, Mn, Fe, Mg, La, Ce, Sr, V, and a combination thereof; Q is selected from the group consisting of Ti, Mo, Mn, and a combination thereof; R is selected from the group consisting of Cr, V, Fe, Sc, Y, and a combination thereof; and Z is selected from the group consisting of V, Cr, Mn, Co, Ni, Cu, and a combination thereof.

The binder improves properties of binding positive active material particles among one another and also, the positive active material with a current collector. Examples of the binder include poly(vinylidenefluoride-hexafluoropropylene), polyvinyl alcohol, carboxylmethyl cellulose, hydroxypropyl cellulose, diacetyl cellulose, polyvinyl chloride, carboxylated polyvinyl chloride, polyvinylfluoride, polymer including ethylene oxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. Any electrically conductive material may be used as a conductive material unless it causes a chemical change. Examples of the conductive material include natural graphite, artificial graphite, carbon black, acetylene black, ketjen black, a carbon fiber, copper, metal powders and metal fiber including copper, nickel, aluminum, silver, or the like. A conductive material such as a polyphenylene derivative may be used by mixing the foregoing materials.

The separator 113 may be a single layer or multilayer, and for example is made of polyethylene, polypropylene, polyvinylidene fluoride, or combinations thereof.

The negative electrode 112 includes a current collector and a negative active material layer positioned on the current collector.

The current collector may include a copper foil, a nickel foil, a stainless steel foil, a titanium foil, a nickel foam, a polymer substrate coated with conductive metals, but is not limited thereto.

The negative active material layer includes a negative active material, a binder, and a conductive material.

The negative active material includes lithium titanate (LTO) as a compound that reversibly intercalates/deintercalates lithium ions.

The lithium titanate may be represented by the following Chemical Formula 1.

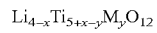

$$Li_{4-x}Ti_{5+x-y}M_yO_{12} \qquad \text{Chemical Formula 1}$$

In Chemical Formula 1, M is an element selected from Mg, V, Cr, Nb, Fe, Ni, Co, Mn, W, Al, Ga, Cu, Mo, P, or a combination thereof, 0≤x≤1, 0≤y≤1.

The binder improves properties of binding active material particles with one another and a negative active material with a current collector. The binder includes a non-water-soluble binder, a water-soluble binder, or a combination thereof.

The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder includes, for example, a styrene-butadiene rubber, an acrylated styrene-butadiene rubber, polyvinyl alcohol, sodium polyacrylate, a copolymer including propylene and a $C_2$ to $C_8$ olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkaline metal salts thereof. The alkaline metal may be Na, K, or Li. The cellulose-based compound may be included in an amount of 0.1 to 3 parts by weight based on 100 parts by weight of the negative active material.

The negative active material composition may further include a solvent, and examples of the solvent include N-methylpyrrolidone, or water and the like, but are not limited thereto.

The conductive material is included to improve electrode conductivity. Any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The electrolyte includes a non-aqueous organic solvent, a lithium salt, and an additive.

The non-aqueous organic solvent serves as a medium for transmitting ions taking part in the electrochemical reaction of a battery. The non-aqueous organic solvent may include a carbonate-based, ester-based, ether-based, ketone-based, alcohol-based, aprotic solvent or a combination thereof.

Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like.

Among these, when the linear carbonate compound and the cyclic carbonate compound are mixed, a dielectric constant and simultaneously, low viscosity may be provided. Herein, the cyclic carbonate compound and the linear carbonate compound may be mixed in a volume ratio of about 1:1 to 1:9.

Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like.

Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like.

Examples of the alcohol-based solvent include ethyl alcohol, isopropyl alcohol, and the like.

Examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio can be controlled in accordance with a desirable battery performance.

The lithium salt is dissolved in an organic solvent and plays a role of supplying lithium ions in a battery, operating a basic operation of the rechargeable lithium battery, and improving lithium ion transportation between positive and negative electrodes therein.

Examples of the lithium salt include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, LiN $(C_xF_{2x+1}SO_2)(C_yF_{2y+1}SO_2)$ (x and y are natural numbers), LiCl, LiI, $LiB(C_2O_4)_2$ (lithium bis(oxalato) borate; LiBOB), or a combination thereof.

The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

The additive may include a sultone-based compound and maleic anhydride.

The sultone-based compound is a cyclic sulfonate ester compound and may include a compound represented by the following Chemical Formula 2.

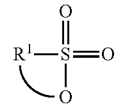

Chemical Formula 2

In Chemical Formula 2, $R^1$ is a substituted or unsubstituted C1 to C6 alkyl group, a substituted or unsubstituted C2 to C6 alkenyl group, or a combination thereof.

The sultone-based compound may include, for example, propane sultone, propene sultone, or a combination thereof.

The electrolyte includes the sultone-based compound and thus, decreases volume expansion of a lithium rechargeable battery, when the battery is stored at a high temperature, and prevents thickness increase of the battery. In addition, the electrolyte includes the maleic anhydride and thus, prevents remarkable deterioration of open circuit voltage (OCV) of the lithium rechargeable battery and as a result, improves battery characteristic.

In general, high temperature storability and open circuit voltage of a lithium rechargeable battery are in a trade-off relationship. In other words, when a lithium rechargeable battery has storability at a high temperature, it may have deteriorated open circuit voltage. On the contrary, the higher open circuit voltage ratio α lithium rechargeable battery maintains, the less storability at a high temperature it may have.

According to the embodiment of the present invention, an electrolyte includes both a sultone-based compound and maleic anhydride as an additive and may simultaneously secure both characteristics, which are usually trade-offs.

The sultone-based compound may be included in an amount of about 0.5 wt % to about 5 wt % based on the total weight of the electrolyte. When the sultone-based compound is included within the range, it may secure storage stability of a lithium rechargeable battery at a high temperature and may not much increase viscosity of an electrolyte.

The maleic anhydride may be included in an amount ranging from about 0.5 wt % to about 5 wt % based on the total weight of the electrolyte. When the maleic anhydride is included within the range, it may maintain open circuit voltage and secure stability of a battery.

The sultone-based compound and the maleic anhydride may be mixed in a weight ratio ranging from about 1:50 to about 50:1 within the range.

The electrolyte may further include an overcharge preventer such as ethylenecarbonate, or pyrocarbonate, or other additives.

The following examples illustrate the present invention in more detail. These examples, however, are not in any sense to be interpreted as limiting the scope of this disclosure.

Fabrication of a Rechargeable Lithium Battery Cell

Example 1

About 90 wt % of $LiCoO_2$, about 5 wt % of poly(vinylidenefluoride-hexafluoropropylene) (P(VdF-HFP)), and about 5 wt % of acetylene black were mixed in N-methylpyrrolidone solvent to prepare a positive electrode slurry. The positive electrode slurry was used to fabricate a positive electrode.

About 90 wt % of $Li_4Ti_5O_{12}$ as a negative active material, about 5 wt % of polyvinylidene fluoride, and about 5 wt % of carbon black were mixed in N-methylpyrrolidone solvent to prepare a negative electrode slurry. The negative electrode slurry was used to fabricate a negative electrode.

The positive and negative electrodes were used with a polyethylene material film as a separator, and an electrolyte to fabricate a rechargeable lithium battery cell. Herein, about 1M of $LiPF_6$ was added to an organic solvent preparing by mixing ethylene carbonate (EC): ethylmethyl carbonate (EMC): dimethyl carbonate (DMC) in a weight ratio of 1:1:1, and about 1 wt % of 1,3-propane sultone and about 1 wt % of maleic anhydride were added thereto as an additive to prepare the electrolyte.

Example 2

A rechargeable lithium battery cell was fabricated according to the same method as Example 1 except for using about 1 wt % of propene sultone instead of about 1 wt % of 1,3-propane sultone in an electrolyte.

Example 3

A rechargeable lithium battery cell was fabricated according to the same method as Example 1 except for using about 0.5 wt % of propene sultone instead of about 1 wt % of 1,3-propane sultone in an electrolyte.

Example 4

A rechargeable lithium battery cell was fabricated according to the same method as Example 1 except for using about 2.0 wt % of propene sultone instead of 1 wt % of 1,3-propane sultone in an electrolyte.

Example 5

A rechargeable lithium battery cell was fabricated according to the same method as Example 1 except for about 5.0 wt % of propene sultone instead of about 1 wt % of 1,3-propane sultone in an electrolyte and about 3 wt % of maleic anhydride instead of about 1 wt % of maleic anhydride.

Example 6

A rechargeable lithium battery cell was fabricated according to the same method as Example 1 except for about 1 wt % of propene sultone instead of about 1 wt % of 1,3-propane sultone and about 0.5 wt % of maleic anhydride instead of about 1 wt % of maleic anhydride in an electrolyte.

Example 7

A rechargeable lithium battery cell was fabricated according to the same method as Example 1 except for about 1 wt % of propene sultone instead of about 1 wt % of 1,3-propane sultone and about 2 wt % of maleic anhydride instead of about 1 wt % of maleic anhydride in an electrolyte.

Example 8

A rechargeable lithium battery cell was fabricated according to the same method as Example 1 except for about 5 wt % of propene sultone instead of about 1 wt % of 1,3-propane sultone and about 5 wt % of maleic anhydride instead of about 1 wt % of maleic anhydride in an electrolyte.

Comparative Example 1

A rechargeable lithium battery cell was fabricated according to the same method as Example 1 except for using graphite instead of $Li_4Ti_5O_{12}$ as a negative active material.

Comparative Example 2

A rechargeable lithium battery cell was fabricated according to the same method as Example 1 except for using graphite instead of $Li_4Ti_5O_{12}$ as a negative active material and about 1 wt % of 1,3-propane sultone instead of about 1 wt % of propene sultone in an electrolyte.

Comparative Example 3

A rechargeable lithium battery cell was fabricated according to the same method as Example 1 except for using no 1,3-propane sultone and maleic anhydride in an electrolyte.

Comparative Example 4

A rechargeable lithium battery cell was fabricated according to the same method as Example 1 except for using no maleic anhydride in an electrolyte.

Comparative Example 5

A rechargeable lithium battery cell was fabricated according to the same method as Example 1 except for using about 1 wt % of propene sultone electrolyte instead of about 1 wt % of 1,3-propane sultone but no maleic anhydride.

Comparative Example 6

A rechargeable lithium battery cell was fabricated according to the same method as Example 1 except for including no 1,3-propane sultone in an electrolyte.

Comparative Example 7

A rechargeable lithium battery cell was fabricated according to the same method as Example 1 except for using about 3 wt % of 1,3-propane sultone instead of about 1 wt % of 1,3-propane sultone and about 1 wt % of succinic anhydride instead of about 1 wt % of maleic anhydride in an electrolyte.

Comparative Example 8

A rechargeable lithium battery cell was fabricated according to the same method as Example 1 except for using about 2 wt % of propene sultone instead of about 1 wt % of 1,3-propane sultone and about 2 wt % of succinic anhydride instead of about 1 wt % of maleic anhydride in an electrolyte.

Comparative Example 9

A rechargeable lithium battery cell was fabricated according to the same method as Example 1 except for using about 2 wt % of propene sultone instead of about 1 wt % of 1, 3-propane sultone and about 1 wt % of acetic acid anhydride instead of about 1 wt % of maleic anhydride in an electrolyte.

Comparative Example 10

A rechargeable lithium battery cell was fabricated according to the same method as Example 1 except for using about 0.2 wt % of propene sultone instead of about 1 wt % of 1,3-propane sultone.

Comparative Example 11

A rechargeable lithium battery cell was fabricated according to the same method as Example 1 except for using about 7 wt % of propene sultone instead of about 1 wt % of 1,3-propane sultone and about 2 wt % of maleic anhydride instead of about 1 wt % of maleic anhydride in an electrolyte.

Comparative Example 12

A rechargeable lithium battery cell was fabricated according to the same method as Example 1 except for using about 7 wt % of maleic anhydride instead of about 1 wt % of maleic anhydride in an electrolyte.

Evaluation

The rechargeable lithium battery cells according to Examples 1 to 8 and Comparative Examples 1 to 12 were evaluated regarding storability at a high temperature and open circuit voltage (OCV) maintenance ratio.

The storability at a high temperature and the open circuit voltage maintenance ratio were evaluated by allowing the rechargeable lithium battery cells according to Examples 1 to 8 and Comparative Examples 1 to 12 to stand at about 60° C. for about 30 days and measuring their thickness increase rate against the initial thickness and open circuit voltage drop degree against the initial voltage. Herein, the rechargeable lithium battery cells had 2V of an initial open circuit voltage.

The result is provided in Table 1.

TABLE 1

|  | Thickness increase ratio after being allowed to stand at 60° C. for 30 days (%) | Open circuit voltage (V) (initial open circuit voltage 2 V) | |
|---|---|---|---|
|  |  | Open circuit voltage after being allowed to stand at 60° C. for 30 days (V) | Maintenance ratio of open circuit voltage (%) |
| Example 1 | 2 | 2.01 | 100 |
| Example 2 | 4.8 | 1.97 | 98.5 |
| Example 3 | 5.3 | 1.99 | 99.5 |
| Example 4 | 3.9 | 1.97 | 98.5 |
| Example 5 | 4.5 | 1.91 | 95.5 |
| Example 6 | 4.9 | 1.97 | 98.5 |
| Example 7 | 5.1 | 1.96 | 98.0 |
| Example 8 | 6.6 | 1.92 | 96 |
| Comparative Example 1 | 17.5 | 3.24 | — |
| Comparative Example 2 | 14.1 | 3.21 | — |
| Comparative Example 3 | 19 | 2.00 | 100 |
| Comparative Example 4 | 3.7 | 1.51 | 75.5 |
| Comparative Example 5 | 5 | 1.13 | 56.5 |
| Comparative Example 6 | 19 | 1.83 | 91.5 |
| Comparative Example 7 | 5.5 | 1.58 | 79.0 |
| Comparative Example 8 | 7.4 | 1.35 | 67.5 |
| Comparative Example 9 | 7.6 | 1.46 | 73 |
| Comparative Example 10 | 17.2 | 1.73 | 86.5 |
| Comparative Example 11 | 12.4 | 0.90 | 45.0 |
| Comparative Example 12 | 18.4 | 1.84 | 92.0 |

Referring to Table 1, when the rechargeable lithium battery cells according to Examples 1 to 8 were allowed to stand at about 60° C. for about 30 days, the cells had a thickness increase rate of less than about 10% and an open circuit voltage maintenance ratio of about 90% or more.

On the contrary, the rechargeable lithium battery cells according to Comparative Examples 1 to 3, 6, and 10 to 12 were identified to have remarkably increased thickness after being allowed to stand at a high temperature. The rechargeable lithium battery cells according to Comparative Examples 4, 5, and 7 to 11 had remarkably deteriorated open circuit voltage after being allowed to stand at a high temperature.

Accordingly, the rechargeable lithium battery cells including a sultone-based compound and maleic anhydride as an additive in an electrolyte according to Examples 1 to 8 had satisfactory storability at a high temperature and simultaneously, satisfactory open circuit voltage maintenance ratio. On the other hand, the rechargeable lithium battery cells according to Comparative Examples 1 to 12 did not have satisfactory storability at a high temperature and open circuit voltage maintenance at the same time, which are usually trade-offs with each other.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable lithium battery comprising:
a positive electrode,
a negative electrode comprising lithium titanate represented by the following Chemical Formula 1, and
an electrolyte comprising a sultone-based compound and maleic anhydride,
wherein the sultone-based compound and the maleic anhydride are each present in an amount of 0.5 wt % to 5 wt % based on the total weight of the electrolyte;

$$Li_{4-x}Ti_{5+x-y}M_yO_{12} \qquad \text{Chemical Formula 1:}$$

wherein,
M is an element selected from Mg, V, Cr, Nb, Fe, Ni, Co, Mn, W, Al, Ga, Cu, Mo, P, or a combination thereof, and $0 \le x \le 1$, and $0 \le y \le 1$;
wherein the sultone-based compound comprises a compound represented by the following Chemical Formula 2:

Chemical Formula 2

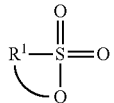

wherein, $R^1$ is a substituted or unsubstituted C1 to C6 alkyl group, or a substituted or unsubstituted C2 to C6 alkenyl group.

2. The rechargeable lithium battery of claim 1, wherein the sultone-based compound comprises propane sultone, propene sultone, or a combination thereof.

3. The rechargeable lithium battery of claim 1, wherein the ratio of sultone-based compound to maleic anhydride ranges from 1:50 to 50:1 by weight.

4. The rechargeable lithium battery of claim 1, which has a thickness increase of less than about 10% and an open circuit voltage (OCV) maintenance ratio of about 90% or more when allowed to stand at about 60° C. for about 30 days.

5. The rechargeable lithium battery of claim 1, wherein the electrolyte further comprises a non-aqueous organic solvent and a lithium salt.

6. The rechargeable lithium battery of claim 5, wherein the non-aqueous organic solvent comprises a carbonate-based, ester-based, ether-based, ketone-based, alcohol-based, or aprotic solvent, or a combination thereof.

\* \* \* \* \*